United States Patent
Zhou et al.

(10) Patent No.: US 12,073,822 B2
(45) Date of Patent: Aug. 27, 2024

(54) VOICE GENERATING METHOD AND APPARATUS, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Xinyong Zhou, Beijing (CN); Junteng Zhang, Beijing (CN); Tao Sun, Beijing (CN); Lei Jia, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 67 days.

(21) Appl. No.: 18/086,004

(22) Filed: Dec. 21, 2022

(65) Prior Publication Data

US 2023/0131494 A1 Apr. 27, 2023

(30) Foreign Application Priority Data

Dec. 23, 2021 (CN) .......................... 202111593297.3

(51) Int. Cl.
*G10L 13/00* (2006.01)
*G06F 40/30* (2020.01)
(Continued)

(52) U.S. Cl.
CPC .............. *G10L 13/10* (2013.01); *G06F 40/30* (2020.01); *G10L 13/06* (2013.01); *G10L 25/18* (2013.01);
(Continued)

(58) Field of Classification Search
None
See application file for complete search history.

(56) References Cited

U.S. PATENT DOCUMENTS

| 2014/0074468 A1 | 3/2014 | Sorin et al. |
| 2016/0005391 A1 | 1/2016 | Agiomyrgiannakis et al. |

(Continued)

FOREIGN PATENT DOCUMENTS

| CN | 106297766 A | 1/2017 |
| CN | 108962217 A | 12/2018 |

(Continued)

OTHER PUBLICATIONS

Search Report for European Patent Application No. 22215866.9, dated May 15, 2023, 13 pages.

(Continued)

*Primary Examiner* — Satwant K Singh
(74) *Attorney, Agent, or Firm* — Lippes Mathias LLP

(57) ABSTRACT

A voice generating method and apparatus, an electronic device and a storage medium. The specific implementation solution includes: acquiring a text to be processed, and determining an associated text of the text to be processed; acquiring an associated prosodic feature of the associated text; determining an associated text feature of the associated text based on the text to be processed; determining a spectrum feature to be processed of the text to be processed based on the associated prosodic feature and the associated (Continued)

text feature; and generating a target voice corresponding to the text to be processed based on the spectrum feature to be processed.

20 Claims, 8 Drawing Sheets

(51) Int. Cl.
    *G10L 13/06*     (2013.01)
    *G10L 13/10*     (2013.01)
    *G10L 25/18*     (2013.01)
    *G10L 13/047*     (2013.01)

(52) U.S. Cl.
    CPC ...... *G10L 13/047* (2013.01); *G10L 2013/105* (2013.01)

(56) References Cited

U.S. PATENT DOCUMENTS

| | | | | |
|---|---|---|---|---|
| 2020/0074985 | A1* | 3/2020 | Clark | G10L 25/24 |
| 2021/0082396 | A1* | 3/2021 | Luan | G10L 13/10 |
| 2021/0350795 | A1* | 11/2021 | Kenter | G10L 15/02 |
| 2022/0051654 | A1* | 2/2022 | Finkelstein | G06N 3/044 |

FOREIGN PATENT DOCUMENTS

| | | | |
|---|---|---|---|
| CN | 112365880 A | 2/2021 | |
| CN | 112487804 A | 3/2021 | |
| CN | 112802444 A | 5/2021 | |
| CN | 115249472 A | 10/2022 | |
| JP | 2018141915 A | 9/2018 | |
| WO | 2021247012 A1 | 12/2021 | |
| WO | WO-2021247012 A1 * | 12/2021 | ............. G10L 13/02 |
| WO | 2023102929 A1 | 6/2023 | |
| WO | 2023102931 A1 | 6/2023 | |

OTHER PUBLICATIONS

Ilyes, Rebai et al.; "Statistical parametric speech synthesis for Arabic language using ANN"; ATSIP 2014; Mar. 17, 2014; 6 pages.

Chen, Sin-Horng et al.; "A First Study on Neural Net Based Generation of Prosodic and Spectral Information for Mandarin Text-to-Speech"; IEEE; Mar. 23, 1992; 4 pages.

Xu, Guanghui et al.; "Improving Prosody Modelling With Cross-Utterance BERT Embeddings for End-to-End Speech Synthesis"; IEEE International Conference on Acoustics, Speech and Signal Processing; Jun. 6, 2021; 5 pages.

Lu, Yanfeng et al.; "Implementing Prosodic Phrasing in Chinese End-to-End Speech Synthesis"; IEEE International Conference on Acoustics, Speech and Signal Processing; May 12, 2019; 5 pages.

Narendra, N.P. et al.; "Development of syllable-based text to speech synthesis system in Bengali"; Int J Speech Technol (2011); Springer Science+Business Media, LLC 2011; Jun. 16, 2011; 15 pages.

Zhang, Weizhao et al.; "Deep Learning for Mandarin-Tibetan Cross-Lingual Speech Synthesis"; IEEE Access; Dec. 3, 2019; 11 pages.

Jianhua, Tao et al.; "Clustering and Feature Learning Based F0 Prediction for Chinese Speech Synthesis"; Interspeech; Sep. 16, 2002; 4 pages.

Vu, Tat Thang et al.; "An HMM-based Vietnamese Speech Synthesis System"; IEEE Aug. 10, 2009; 6 pages.

Office Action for Chinese Application No. 202111593297.3, dated Jul. 25, 2022, 11 pages.

Notice of Allowance for Chinese Application No. 202111593297.3, dated Sep. 28, 2022, 4 pages.

Office action for EP application 22215866.9, dated Feb. 13, 2024, 5 pages.

Zhang, Ya-Jie et al.; "Maskedspee: Chcontext-Aware Speech Synthesis With Masking Strategy"; JD Technology Group; Nov. 11, 2022; 5 pages.

\* cited by examiner

VOICE GENERATING METHOD AND APPARATUS, ELECTRONIC DEVICE AND STORAGE MEDIUM

CROSS REFERENCE TO RELATED APPLICATIONS

This application is based on and claims priority to Chinese patent applications Serial No. 202111593297.3 filed on Dec. 23, 2021, the entire contents of which are incorporated herein by reference.

TECHNICAL FIELD

The disclosure relates to a field of artificial intelligence technologies, specifically to technical fields of voice synthesis and natural language processing (NLP), and particularly to a voice generating method and apparatus, an electronic device and a storage medium.

BACKGROUND

Artificial intelligence (AI) is a subject that learns simulating certain thinking processes and intelligent behaviors (such as learning, reasoning, thinking, planning, etc.) of human beings by a computer, which covers hardware-level technologies and software-level technologies. AI hardware technologies generally include technologies such as sensors, dedicated AI chips, cloud computing, distributed storage, big data processing, etc.; AI software technologies mainly include computer vision technology, speech recognition technology, natural language processing (NLP) technology and machine learning (ML), deep learning (DL), big data processing technology, knowledge graph (KG) technology, etc.

In the related art, a prosodic related feature is generally extracted from a text to synthesize a voice.

SUMMARY

The disclosure provides a voice generating method and apparatus, an electronic device, a storage medium and a computer program product.

According to a first aspect of the disclosure, a voice generating method is provided, and includes: acquiring a text to be processed, and determining an associated text of the text to be processed; acquiring an associated prosodic feature of the associated text; determining an associated text feature of the associated text based on the text to be processed; determining a spectrum feature to be processed of the text to be processed based on the associated prosodic feature and the associated text feature; and generating a target voice corresponding to the text to be processed based on the spectrum feature to be processed.

According to a second aspect of the disclosure, an electronic device is provided, and includes: at least one processor; and a memory communicatively connected to the at least one processor; the memory is stored with instructions executable by the at least one processor, when the instructions are performed by the at least one processor, the at least one processor is caused to perform the voice generating method as described in the first aspect of the disclosure.

According to a third aspect of the disclosure, a non-transitory computer readable storage medium stored with computer instructions is provided. The computer instructions are configured to perform the voice generating method as described in the first aspect by a computer.

According to a fourth aspect of the disclosure, a computer program product including a computer program is provided. The computer program implements the voice generating method as described in the first aspect when executed by a processor.

It should be understood that, the content described in the part is not intended to identify key or important features of embodiments of the disclosure, nor intended to limit the scope of the disclosure. Other features of the disclosure will be easy to understand through the following specification.

BRIEF DESCRIPTION OF THE DRAWINGS

The drawings are intended to better understand the solution, and do not constitute a limitation to the disclosure.

DETAILED DESCRIPTION

The exemplary embodiments of the present disclosure are described as below with reference to the accompanying drawings, which include various details of embodiments of the present disclosure to facilitate understanding, and should be considered as merely exemplary. Therefore, those skilled in the art should realize that various changes and modifications may be made to the embodiments described herein without departing from the scope and spirit of the present disclosure. Similarly, for clarity and conciseness, descriptions of well-known functions and structures are omitted in the following descriptions.

Figure 1:
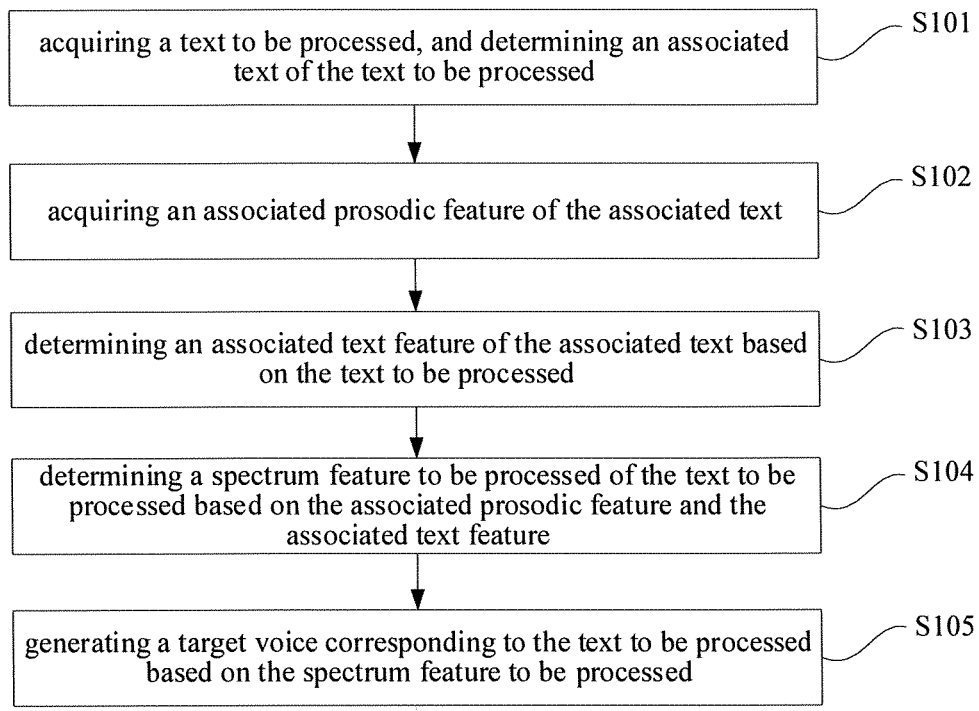
FIG. 1 is a diagram according to a first embodiment of the disclosure.

FIG. 1 is a diagram according to a first embodiment of the disclosure.

It needs to be noted that, an executive body of a voice generating method according to an embodiment is a voice generating apparatus, the apparatus may be implemented by means of software and/or hardware and may be configured in an electronic device, and the electronic device may include but not limited to a terminal, a server side, etc.

The embodiments of the disclosure relate to a field of artificial intelligence technologies, specifically to technical fields of voice recognition and natural language processing (NLP).

Artificial Intelligence, abbreviated as AI in English, is a new science of technology that studies and develops theories, methods, technologies and application systems configured to simulate, extend and expand human intelligence.

Voice synthesis refers to a technology for generating an artificial voice by means of a mechanical and electronic method, which is a technology for transforming text information produced by a computer itself or input externally into an intelligible and fluent spoken language for output and converting any text information into a standard fluent voice for readout.

Natural language processing (NLP) belongs to a field that computer science, artificial intelligence and linguistics focus on interaction between computer language and human (natural) language. NLP analyzes, understands and processes natural language using a computer technology with language as an object, that is, NLP performs quantitative research processing on linguistic information with the support of a computer by taking the computer as a language research tool, and provides a language description that may be jointly used between human and a computer.

As illustrated in FIG. 1, the voice generating method includes the following.

At S101, a text to be processed is acquired, and an associated text of the text to be processed is determined.

The text to be processed refers to a text on which voice generation is to be performed, and the text to be processed, for example, may be a news broadcast transcript text or a novel text, or may be any other type of text on which voice generation is to be performed, which is not limited herein.

The associated text refers to a context text of the text to be processed, the context text may be a preceding text of the text to be processed, for example, the preceding text of the text to be processed may be a previous sentence text or a previous paragraph text of the text to be processed, or may be a text corresponding to a previous voice frame of the text to be processed on which voice generation is currently performed, which is not limited herein.

In the embodiment of the disclosure, the associated text may be a text on which voice generation has been performed, and the associated text has a synthesized voice segment corresponding to the text.

In the embodiment of the disclosure, when the text to be processed is obtained, an apparatus for collecting a text may be pre-configured on a voice generating apparatus and may be configured to collect a text such as a news broadcast transcript text on which voice generation is performed as the text to be processed, or a data transmission interface may be pre-configured on the voice generating apparatus, and the text to be processed may be received via the data transmission interface, which is not limited herein.

In the embodiment of the disclosure, when the associated text of the text to be processed is determined, the previous sentence text or the previous paragraph text of the text to be processed may be selected as the associated text of the text to be processed after the text to be processed is acquired, or the text corresponding to the previous voice frame of the text on which voice generation is currently performed is acquired as the associated text, which is not limited here.

At S102, an associated prosodic feature of the associated text is acquired.

The prosodic feature refers to a linguistic feature of a text such as intonation, time domain distribution and stress, and the prosodic feature may be, for example, a duration variation feature such as long and short sounds, a pitch change feature such as high and low pitches, or an intensity change feature such as unstressed and stressed sounds, or further may be voice pause or other linguistic features related to intonation, which is not limited herein.

The associated prosodic feature refers to a linguistic feature such as duration, pitch and intensity of the associated text, and the associated prosodic feature may be configured to describe a context atmosphere and a voice emotional expression atmosphere of the associated text.

In the embodiment of the disclosure, after the text to be processed is acquired and the associated text of the text to be processed is determined, the associated prosodic feature of the associated text may be acquired.

In the embodiment of the disclosure, when the associated prosodic feature of the associated text is acquired, a voice segment corresponding to the associated text may be acquired, and the associated spectrum feature corresponding to the associated text may be obtained by parsing the voice segment corresponding to the associated text using a voice parsing model, and the associated spectrum feature is input into a prosodic feature extractor, and the associated spectrum feature of the associated text is extracted using the prosodic feature extractor, and the output result of the prosodic feature extractor is taken as the associated prosodic feature of the associated text At S103, an associated text feature of the associated text is determined based on the text to be processed.

The associated text feature refers to a semantic information feature of the associated text, and may be configured to assist in predicting the prosodic feature of the text to be processed, and assist in voice generation processing on a current sentence of the text to be processed.

In the embodiment of the disclosure, after the text to be processed is acquired and the associated text of the text to be processed is determined, the associated text feature of the associated text may be determined based on the text to be processed.

In the embodiment of the disclosure, when the associated text feature of the associated text is determined based on the text to be processed, the associated text may be input into a context feature extractor, and the context feature extractor analyzes the associated text to extract the associated text feature of the associated text.

At S104, a spectrum feature to be processed of the text to be processed is determined based on the associated prosodic feature and the associated text feature.

The spectrum feature to be processed refers to an acoustic information feature that converts the text to be processed to an audio, and the spectrum feature to be processed may be a Mel spectrum corresponding to the text to be processed, and the acoustic feature of the text to be processed may be converted into a corresponding synthesized voice based on the spectrum feature to be processed.

In the embodiment of the disclosure, after the associated prosodic feature and the associated text feature of the associated text are determined, the spectrum feature to be processed of the text to be processed may be determined based on the associated prosodic feature and the associated text feature.

In the embodiment of the disclosure, when the spectrum feature to be processed of the text to be processed is determined based on the associated prosodic feature and the associated text feature, a generation process of the spectrum feature to be processed refers to an encoding module and a decoding module. In the encoding module of generating the spectrum feature to be processed, the text to be processed may be input into a character embedding processing model and may be processed into a character vector, then the character vector is input into a convolutional neural network, the character vector is processed using a convolutional layer, and the output of the convolutional layer is input into a long short-term memory (LSTM) neural network for processing to obtain a linguistic feature of the text to be processed, and the linguistic feature, the associated prosodic feature and the associated text feature of the text to be processed may be spliced to obtain a spliced feature.

In the embodiment of the disclosure, after the associated prosodic feature of the associated text feature, the associated text feature and the text to be processed are encoded through the above encoding phase, a sound spectrum of the text to be processed at the current moment may be predicted to obtain a predicted sound spectrum at the current moment, and the spliced feature acquired at the encoding phase may be input into an attention mechanism processing model for weight calculation, and weight allocation is performed on the spliced feature based on the obtained weight to obtain features after weight allocation, and the feature with allocated weight is input into an LSTM neural network layer for prediction processing, and the sound spectrum output by the LSTM neural network is taken as the spectrum feature to be processed of the text to be processed, or the spectrum feature to be processed of the text to be processed may be determined based on the associated prosodic feature and the associated text feature using any other possible ways, which is not limited here.

At S105, a target voice corresponding to the text to be processed is generated based on the spectrum feature to be processed.

The target voice refers to a generated audio segment corresponding to the text after performing voice synthesis on the text to be processed.

In the embodiment of the disclosure, after the spectrum feature to be processed of the text to be processed is determined based on the associated prosodic feature and the associated text feature, the target voice corresponding to the text to be processed may be generated based on the spectrum feature to be processed.

In the embodiment of the disclosure, when the target voice corresponding to the text to be processed is generated based on the spectrum feature to be processed, the spectrum feature to be processed may be input into a vocoder, and the spectrum feature to be processed representing the acoustic feature of the text to be processed may be converted into a voice segment corresponding to the text to be processed, and the voice segment generated through conversion may be taken as the target voice corresponding to the text to be processed.

In another embodiment, when the target voice corresponding to the text to be processed is generated based on the spectrum feature to be processed, the spectrum feature to be processed is processed using a sounder algorithm to convert the spectrum into a voice, so as to generate the target voice corresponding to the text to be processed, or the target voice corresponding to the text to be processed may be generated based on the spectrum feature to be processed using any other possible ways, which is not limited herein.

Figure 2:
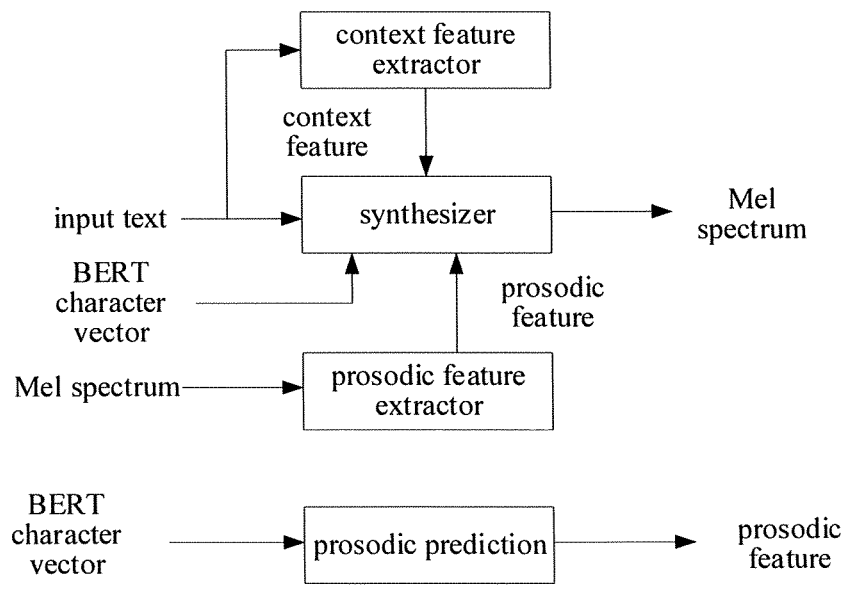
FIG. 2 is a flowchart illustrating voice generation according to an embodiment of the disclosure.

For example, FIG. 2 is a flowchart illustrating voice generation according to an embodiment of the disclosure. As illustrated in FIG. 2, a text to be processed and an associated text of the text to be processed are acquired, an associated prosodic feature of the associated text is extracted using a prosodic feature extractor, and representation processing is performed on the associated text using a pre-trained Bidirectional Encoder Representation from Transformers (BERT) model to obtain a BERT character vector corresponding to the associated text, so as to extract an associated text feature corresponding to the associated text, and a spectrum feature to be processed of the text to be processed may be predicted based on the associated prosodic feature and the associated text feature, and a target voice corresponding to the text to be processed may be generated based on the spectrum feature to be processed.

In the embodiment, the associated prosodic feature of the text to be processed is acquired by acquiring the text to be processed and determining the associated text of the text to be processed, the associated text feature of the associated text is determined based on the text to be processed, the spectrum feature to be processed of the text to be processed is determined based on the associated prosodic feature and the associated text feature, and the target voice corresponding to the text to be processed may be generated based on the spectrum feature to be processed, so that the associated text of the text to be processed is determined, and the prosodic feature of the text to be processed is adjusted by fully combining the associated prosodic feature of the associated text, which effectively improves the accuracy of spectrally representing the text to be processed by the spectrum feature to be processed, thereby effectively improving a representation effect of the synthesized target voice and improving practicability and applicability of the target voice in an application scene.

Figure 3:
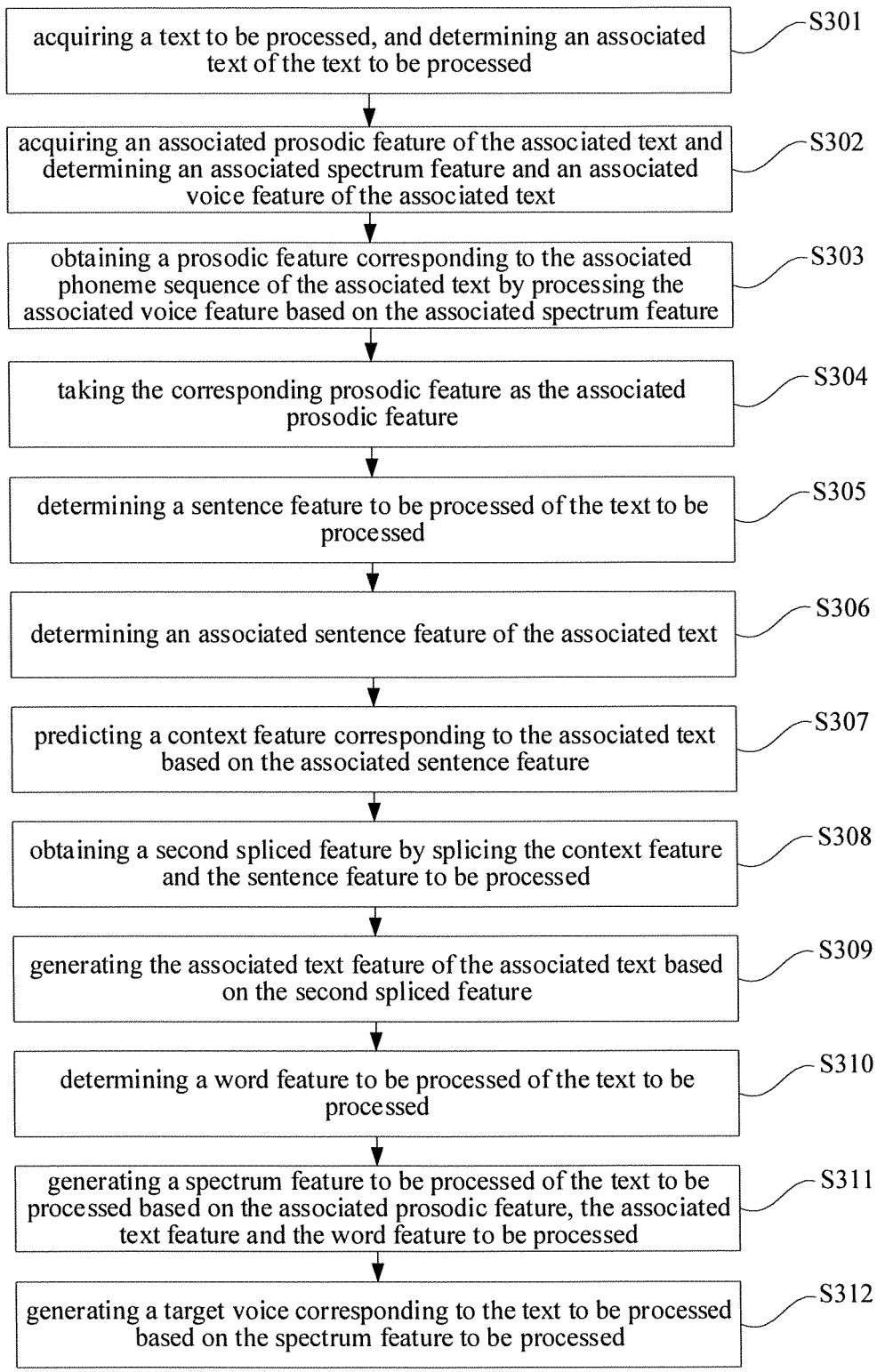
FIG. 3 is a diagram according to a second embodiment of the disclosure.

FIG. 3 is a diagram according to a second embodiment of the disclosure.

As illustrated in FIG. 3, the voice generating method includes the following.

At S301, a text to be processed is acquired, and an associated text of the text to be processed is determined.

The explanation of S301 may refer to the above embodiment, which will not be repeated here.

At S302, an associated spectrum feature and an associated voice feature of the associated text are determined.

The associated spectrum feature refers to an acoustic feature of a synthesized voice segment corresponding to the associated text.

The associated voice feature may refer to a text linguistic feature and a text semantic feature corresponding to the associated text, the text linguistic feature corresponding to the associated text is configured to indicate a pronunciation manner of corresponding words and vocabularies in the associated text, the text linguistic feature corresponding to the associated text may be, for example, intonation and pronunciation of words in the associated text, and the text semantic feature corresponding to the associated text is configured to represent a text content meaning corresponding to the associated text.

In the embodiment of the disclosure, when the associated spectrum feature of the associated text is determined, the voice segment corresponding to the associated text may be input into a semantic parsing model, and an output result of the semantic parsing model is obtained by parsing the voice segment using the semantic parsing model and taken as the associated spectrum feature of the associated text.

In the embodiment of the disclosure, when the associated voice feature of the associated text is determined, the text linguistic feature and the text semantic feature corresponding to the associated text may be correspondingly extracted.

In the embodiment of the disclosure, when the text linguistic feature corresponding to the associated text is acquired, the associated text may be input into a character embedding processing model and processed into a character vector, the character vector is input into a convolutional neural network and processed using a convolutional layer, and the output result of the convolutional layer is input into a bidirectional long short-term memory (LSTM) neural network for processing to obtain the text linguistic feature corresponding to the associated text.

In the embodiment of the disclosure, when the text semantic feature corresponding to the associated text is determined, the associated text may be input into a pre-trained Bidirectional Encoder Representation from Transformers (BERT) model, and the associated text may be processed using the pre-trained BERT model to obtain a character vector corresponding to the associated text, and the character vector corresponding to the associated text may be input into a Cony Bank Highway GRU_RNN (CBHG) module for processing to obtain the text semantic feature corresponding to the associated text.

In the embodiment of the disclosure, after the text linguistic feature and the text semantic feature corresponding to the associated text are acquired, the text linguistic feature and the text semantic feature corresponding to the associated text may be taken as the associated voice feature of the associated text.

At S303, a prosodic feature corresponding to an associated phoneme sequence of the associated text is obtained by processing the associated voice feature based on the associated spectrum feature.

A phoneme refers to a minimum voice unit that affects a pronunciation, for example, the phoneme may be a Chinese pinyin of a Chinese word, or may be an English letter in an English vocabulary, or may be a minimum voice unit of any other language, which is not limited here.

The associated phoneme sequence corresponding to the associated text refers to a sequence including all phonemes corresponding to the words constituting the associated text, for example, when the content of the associated text is "你好 (Hello)", the phoneme sequence corresponding to the associated text may be "nihao (Chinese pinyin of 你好)".

In the embodiment of the disclosure, when the prosodic feature corresponding to the associated phoneme sequence of the associated text is obtained by processing the associated voice feature based on the associated spectrum feature, the associated spectrum feature may be input into a convolutional neural network and processed using a convolutional layer, and the output result of the convolutional neural network may be input into a bidirectional gate recurrent unit (GRU) layer which may obtain an output result of the bidirectional GRU layer by perform bidirectional feature modeling processing on the associated spectrum feature processed by the convolutional neural network from front to rear and from rear to front, and the output result and the associated voice feature of the associated text are input into an attention model for weight calculation, to obtain a fine-grained prosodic feature at a phoneme level output by the attention model, and the fine-grained prosodic feature at the phoneme level is taken as the prosodic feature corresponding to the associated phoneme sequence of the associated text.

Figure 4:
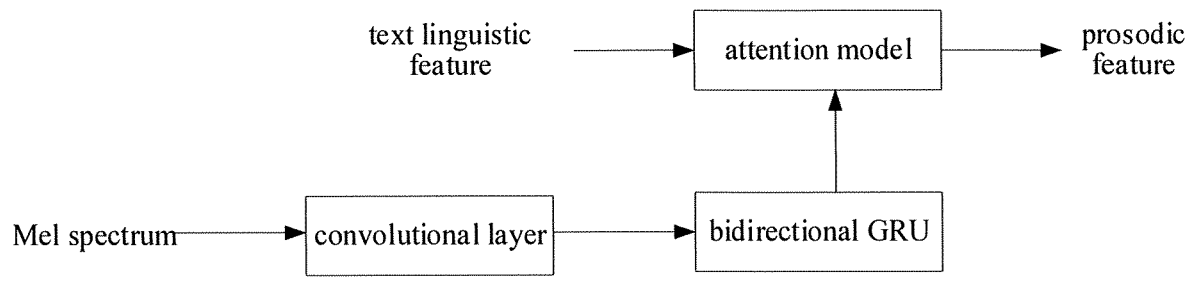
FIG. 4 is a flowchart illustrating prosodic feature extraction according to an embodiment of the disclosure.

For example, as illustrated in FIG. 4, FIG. 4 is a flowchart illustrating prosodic feature extraction according to an embodiment of the disclosure. The associated spectrum feature may be sequentially input into a convolutional layer and a bidirectional GRU layer, bidirectional feature modeling processing is performed on the associated spectrum feature using the bidirectional GRU layer to obtain the output result of the bidirectional GRU layer, and the output result and the text linguistic feature of the associated text are collectively input into an attention model for calculation to obtain a fine-grained prosodic feature at a phoneme level output by the attention model, and the fine-grained prosodic feature at the phoneme level is taken as the prosodic feature corresponding to the associated phoneme sequence of the associated text.

At S304, the corresponding prosodic feature is taken as the associated prosodic feature.

In the embodiment of the disclosure, after the prosodic feature corresponding to the associated phoneme sequence of the associated text is obtained by processing the associated voice feature based on the associated spectrum feature, the corresponding prosodic feature may be taken as the associated prosodic feature, and the associated prosodic feature may be configured to assist in determining the text prosodic feature of the text to be processed and performing voice generation on the text to be processed, which may refer to subsequent embodiments.

In the embodiment, by determining the associated voice feature and the associated spectrum feature of the associated text and processing the associated voice feature based on the associated spectrum feature, the prosodic feature corresponding to the associated phoneme sequence of the associated text is obtained and the corresponding prosodic feature is taken as the associated prosodic feature, so that the associated prosodic feature corresponding to the associated text may be extracted based on the associated spectrum feature and the associated voice feature, and the associated prosodic feature may be configured to assist in determining the text prosodic feature of the text to be processed, thereby acquiring rich and accurate text prosodic feature in the text to be processed. Further, since the associated prosodic feature is the prosodic feature corresponding to the associated phoneme sequence, fine-grained extraction may be achieved on prosodic feature, which improves the accuracy of prosodic change detection, and assists in generating the target voice carrying rich prosodics.

At S305, a sentence feature to be processed of the text to be processed is determined.

The sentence feature to be processed refers to a vector feature with a sentence as a unit in the text to be processed.

In the embodiment of the disclosure, when the sentence feature to be processed of the text to be processed is determined, the text to be processed may be input into a pre-trained BERT model and analyzed using the pre-trained BERT model, to acquire a sentence vector at a sentence level and a corresponding vector feature, and the acquired corresponding vector feature may be taken as the sentence feature to be processed of the text to be processed.

At S306, an associated sentence feature of the associated text is determined.

The associated sentence feature refers to a vector feature with a sentence as a unit in the associated text.

In the embodiment of the disclosure, when the associated sentence feature of the associated text is determined, the associated text may be input into a pre-trained BERT model and analyzed using the pre-trained BERT model, to acquire a sentence vector at a sentence level and a corresponding vector feature, and the acquired corresponding vector feature is taken as the associated sentence feature of the associated text.

At S307, a context feature corresponding to the associated text is predicted based on the associated sentence feature.

The context feature refers to a context semantic information feature of a text paragraph where the associated text is located.

In the embodiment of the disclosure, after the associated sentence feature of the associated text is determined, the context feature corresponding to the associated text may be predicted based on the associated sentence feature.

In the embodiment of the disclosure, when the context feature corresponding to the associated text is predicted based on the associated sentence feature, the associated sentence feature may be input into a linear layer, mapping processing is performed on the associated sentence feature using the linear layer, and splitting processing is performed on the associated sentence feature based on a time sequence to obtain the associated feature of the associated sentence and the associated feature of the current sentence, and the associated feature of the associated sentence obtained by splitting processing is input into a unidirectional GRU layer for prediction processing, and unidirectional feature modeling is performed on the associated feature of the associated sentence using the unidirectional GRU layer, to obtain the context feature corresponding to the associated text.

At S308, a second spliced feature is obtained by splicing the context feature and the sentence feature to be processed.

The second spliced feature refers to a sentence feature obtained by splicing the context feature and the sentence feature to be processed, and may be configured to generate the associated text feature of the associated text.

In the embodiment of the disclosure, when the context feature and the sentence feature to be processed are spliced, the context feature and the sentence feature to be processed may be spliced, and the spliced feature may be taken as the second spliced feature.

At S309, the associated text feature of the associated text is generated based on the second spliced feature.

In the embodiment of the disclosure, after the context feature and the sentence feature to be processed are spliced to obtain the second spliced feature, the second spliced feature may be input into a linear layer for prediction processing, to obtain a processed second spliced feature, and the processed second spliced feature may be taken as the associated text feature of the associated text.

Figure 5:
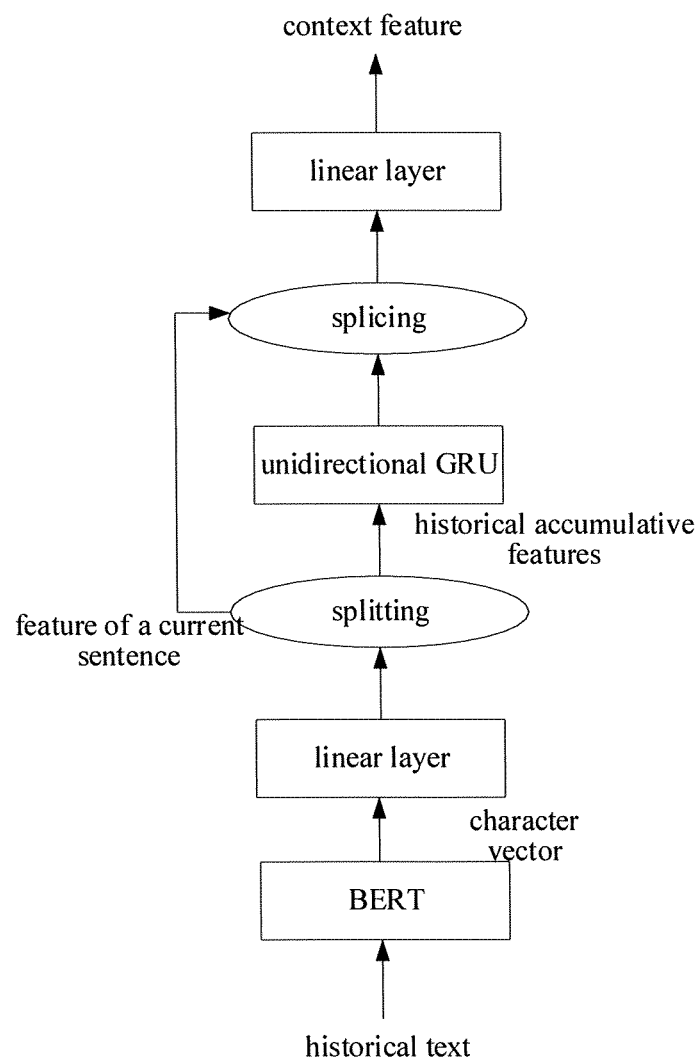
FIG. 5 is a flowchart illustrating associated text feature generation according to an embodiment of the disclosure.

For example, as illustrated in FIG. 5, FIG. 5 is a flowchart illustrating associated text feature generation according to an embodiment of the disclosure. The associated text may be input into a pre-trained BERT model and analyzed using the pre-trained BERT model, to obtain an associated sentence feature, and the associated sentence feature is input into a linear layer for mapping processing, and splitting processing is performed on the mapping result of the linear layer based on a time sequence to obtain the associated feature of the associated text and the feature corresponding to the current sentence, and since the associated feature of the associated text and the feature corresponding to the current sentence segmented are the splitting results based on the time sequence, the associated feature of the associated text is input into a unidirectional GRU layer for unidirectional feature modeling, to obtain the context feature corresponding to the associated text, and the context feature and the sentence feature to be processed are spliced to obtain the second spliced feature, and the second spliced feature is input into a linear layer for prediction processing, to generate the associated text feature of the associated text.

In the embodiment, the associated sentence feature of the associated text is determined by determining the sentence feature to be processed of the text to be processed, the context feature corresponding to the associated text is predicted based on the associated sentence feature, and the second spliced feature is obtained by splicing the context feature and the sentence feature to be processed, and the associated text feature of the associated text is generated based on the second spliced feature, so that the context feature of the associated text may be predicted and the associated text feature of the associated text may be generated, the associated text feature may assist in generating the spectrum feature to be processed of the text to be processed, thus acquiring a richer spectrum feature to be processed for voice generation, and effectively enriching prosodic change in the generated voice segment corresponding to the text to be processed.

At S310, a word feature to be processed of the text to be processed is determined.

The word feature to be processed refers to a vector feature at a word level in the text to be processed, and may be configured to a feature representing word semantic in the text to be processed.

In the embodiment of the disclosure, when the word feature to be processed of the text to be processed is determined, the text to be processed may be input into a pre-trained BERT model and processed using the pre-trained BERT model, to acquire a vector feature at a word level output by the pre-trained BERT model, and the output vector feature at the word level may be taken as the word feature to be processed.

At S311, a spectrum feature to be processed of the text to be processed is generated based on the associated prosodic feature, the associated text feature and the word feature to be processed.

In the embodiment of the disclosure, after the associated prosodic feature, the associated text feature and the word feature to be processed of the associated text are determined, the spectrum feature to be processed of the text to be processed may be generated based on the associated prosodic feature, the associated text feature and the word feature to be processed.

In the embodiment of the disclosure, when the spectrum feature to be processed of the text to be processed is generated based on the associated prosodic feature, the associated text feature and the word feature to be processed, the spectrum feature to be processed may be predicted based on the associated prosodic feature, the associated text feature and the word feature to be processed, and the predicted spectrum feature may be taken as the spectrum feature to be processed of the text to be processed.

In the embodiment of the disclosure, by determining the word feature to be processed of the text to be processed, and generating the spectrum feature to be processed of the text to be processed based on the associated prosodic feature, the associated text feature and the word feature to be processed, fine-grained word processing may be performed on the text to be processed to obtain more detailed spectrum feature to be processed of the text to be processed, thereby assisting in fine control of prosodic change of the voice segment generated based on the spectrum feature to be processed.

At S312, a target voice corresponding to the text to be processed is generated based on the spectrum feature to be processed.

The explanation of S312 may refer to the above embodiment, which will not be repeated here.

In the embodiment, by determining the associated voice feature and the associated spectrum feature of the associated text, obtaining the prosodic feature corresponding to the associated phoneme sequence of the associated text by processing the associated voice feature based on the associated spectrum feature, and taking the corresponding prosodic feature as the associated prosodic feature, the associated prosodic feature corresponding to the associated text may be extracted based on the associated spectrum feature and the associated voice feature, and the associated prosodic feature may be configured to assist in determining the text prosodic feature of the text to be processed, thereby acquiring the rich and accurate text prosodic feature in the text to be processed. Since the associated prosodic feature is the prosodic feature corresponding to the associated phoneme sequence, fine-grained extraction of the prosodic feature may be achieved, which improves the accuracy of prosodic change detection, and assists in generating the target voice carrying the rich prosodic feature. By determining the sentence feature to be processed of the text to be processed, determining the associated sentence feature of the associated text, predicting the context feature corresponding to the associated text based on the associated sentence feature, obtaining the second spliced feature by splicing the context feature and the sentence feature to be processed, and generating the associated text feature of the associated text based on the second spliced feature, the context feature of the associated text may be predicted and the associated text feature of the associated text may be generated, the associated text feature may assist in generating the spectrum feature to be processed of the text to be processed, thus acquiring the richer spectrum feature to be processed for voice generation, and effectively enriching prosodic change in the generated voice segment corresponding to the text to be processed. By determining the word feature to be processed of the text to be processed, generating the spectrum feature to be processed of the text to be processed based on the associated prosodic feature, the associated text feature and the word feature to be processed, fine-grained word processing may be performed on the text to be processed to obtain more detailed spectrum feature to be processed of the text to be processed, thereby assisting in fine control of prosodic change of the voice segment generated based on the spectrum feature to be processed.

Figure 6:
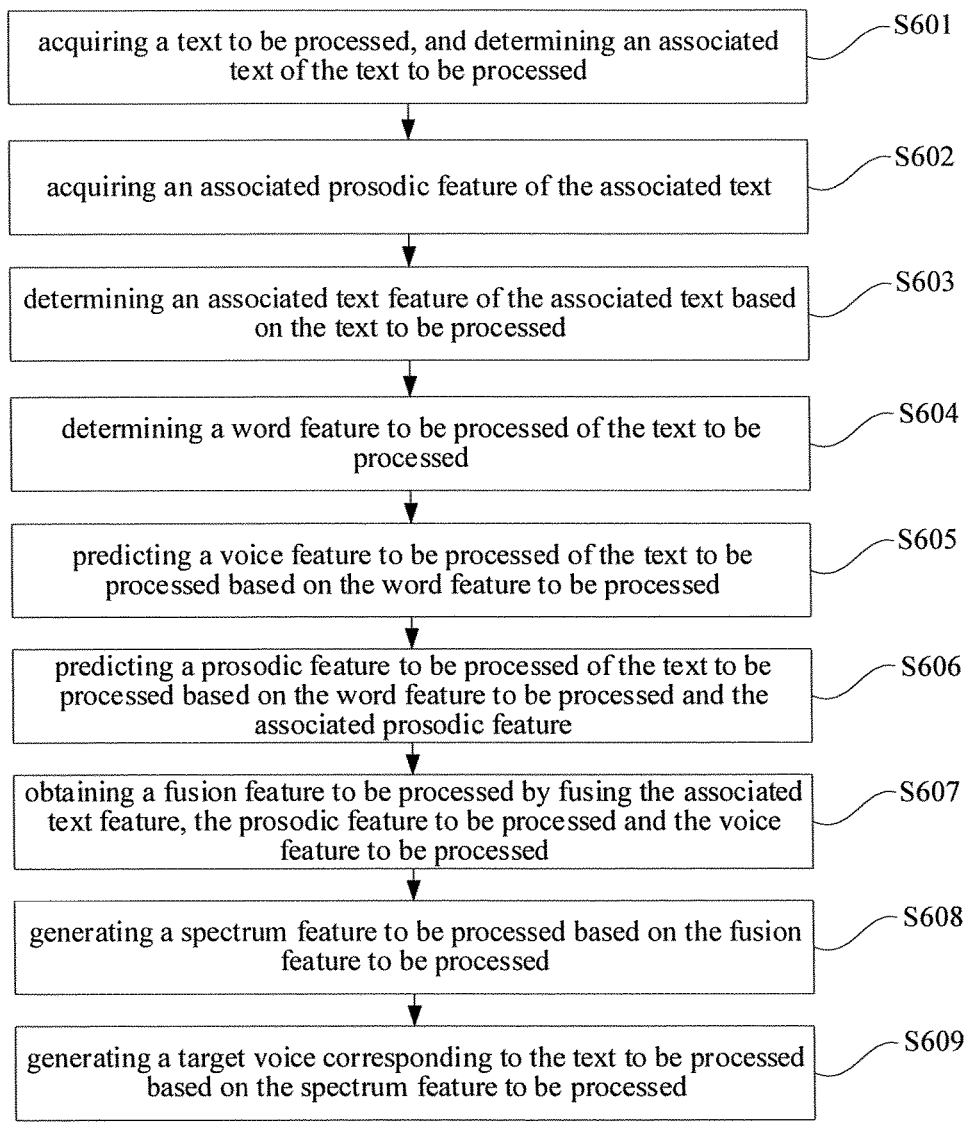
FIG. 6 is a diagram according to a third embodiment of the disclosure.

FIG. 6 is a diagram according to a third embodiment of the disclosure.

As illustrated in FIG. 6, the voice generating method includes the following.

At S601, a text to be processed is acquired, and an associated text of the text to be processed is determined.

At S602, an associated prosodic feature of the associated text is acquired.

At S603, an associated text feature of the associated text is determined based on the text to be processed.

At S604, a word feature to be processed of the text to be processed is determined.

The explanation of S601 to S604 may refer to the above embodiment, which will not be repeated here.

At S605, a voice feature to be processed of the text to be processed is predicted based on the word feature to be processed.

The voice feature to be processed refers to a linguistic-related feature and a semantic-related feature corresponding to the text to be processed, and may be configured to describe a syntactic structure and text content semantic information of the text to be processed.

In the embodiment of the disclosure, when the voice feature to be processed of the text to be processed is predicted based on the word feature to be processed, a feature extraction model and a convolutional neural network may be used to predict the word feature to be processed, to obtain the linguistic-related feature and the semantic-related feature corresponding to the text to be processed, and the linguistic-related feature and the semantic-related feature may be taken as the voice feature to be processed of the text to be processed.

Optionally, in some embodiments, when predicting the voice feature to be processed of the text to be processed based on the word feature to be processed, the linguistic feature to be processed and the semantic feature to be processed of the text to be processed may be predicted based on the word feature to be processed and collectively taken as the voice feature to be processed, so that the linguistic feature to be processed and the semantic feature to be processed of the text to be processed may be acquired as the voice feature to be processed, which may acquire the richer linguistic feature to be processed corresponding to the text to be processed and perform voice generation on the text to be processed in combination with the linguistic feature and the semantic feature of the text to be processed, thus effectively improving intonation consistency and naturalness of the generated voice segment.

The voice feature to be processed may refer to the text linguistic feature and the text semantic feature corresponding to the text to be processed, the text linguistic feature corresponding to the text to be processed is configured to indicate a pronunciation manner of corresponding words and vocabularies in the text to be processed, for example, the text linguistic feature corresponding to the text to be processed may be intonation and pronunciation of words in the text to be processed, and the text semantic feature corresponding to the text to be processed is configured to represent a text content meaning corresponding to the text to be processed.

In the embodiment of the disclosure, when the voice feature to be processed of the text to be processed is predicted based on the word featured to be processed, the text linguistic feature and the text semantic feature corresponding to the text to be processed may be correspondingly extracted.

In the embodiment of the disclosure, when the text linguistic feature corresponding to the text to be processed is acquired, the text to be processed may be input into a character embedding processing model and processed into a character vector, the character vector is input into a convolutional neural network and processed using a convolutional layer, and the output result of the convolutional layer is input into a bidirectional long short-term memory (LSTM) neural network for prediction processing, to obtain the text linguistic feature of the text to be processed.

In the embodiment of the disclosure, when the text semantic feature corresponding to the text to be processed is determined, the text to be processed may be input into a pre-trained Bidirectional Encoder Representation from Transformers (BERT) model, the text to be processed is processed using the pre-trained BERT model to obtain a character vector corresponding to the text to be processed, and the character vector corresponding to the text to be processed is input into a Cony Bank Highway GRU_RNN (CBHG) module for prediction processing, to obtain the text semantic feature corresponding to the text to be processed.

In the embodiment of the disclosure, after the text linguistic feature and the text semantic feature corresponding to the text to be processed are acquired, the text linguistic feature and the text semantic feature corresponding to the text to be processed may be taken as the voice feature to be processed of the text to be processed.

At S606, a prosodic feature to be processed of the text to be processed is predicted based on the word feature to be processed and the associated prosodic feature.

The prosodic feature to be processed refers to a linguistic feature such as duration, pitch and intensity of the text to be processed, and the prosodic feature to be processed may be configured to describe a context atmosphere and a voice emotional expression atmosphere of the text to be processed.

In the embodiment of the disclosure, when the prosodic feature to be processed of the text to be processed is predicted based on the word feature to be processed and the associated prosodic feature, the word feature to be processed may be input into a two-layer linear layer for mapping, the associated prosodic feature may be input into a preprocessing neural network for processing, the output of the linear layer and the output of the preprocessing neural network may be spliced, and the spliced output result may be predicted using a long short-term memory (LSTM) neural network, to obtain the prosodic feature to be processed of the text to be processed.

Optionally, in some embodiments, when the prosodic feature to be processed of the text to be processed is predicted based on the word feature to be processed and the associated prosodic feature, the phoneme sequence to be processed corresponding to the text to be processed may be determined, the word feature to be processed is aligned based on the phoneme sequence to be processed to obtain a target word feature, and the prosodic feature to be processed of the text to be processed is predicted based on the target word feature and the associated prosodic feature, so that when the text length is short, the word feature to be processed and the associated prosodic feature may be spliced by aligning the word feature to be processed based on the phoneme sequence to be processed, and the spliced feature may be configured to predict the prosodic feature to be processed of the text to be processed, thereby achieving fine-grained prosodic control of the text to be processed at a phoneme level, and assisting in improving richness of prosodic change of the generated voice corresponding to the text to be processed.

The phoneme sequence to be processed corresponding to the text to be processed refers to a sequence including all phonemes corresponding to the words constituting the text to be processed.

The target word feature refers to an aligned word feature to be processed, the target word feature may be a word feature containing a complete voice, and the target word feature may be configured to predict the prosodic feature to be processed of the text to be processed.

In the embodiment of the disclosure, when the prosodic feature to be processed of the text to be processed is predicted based on the word feature to be processed and the associated prosodic feature, phoneme decomposition processing may be performed on the text to be processed based on the word feature to be processed, and the word feature to be processed may be input into a two-layer linear layer for mapping and dimension-reduction representation, to determine the phoneme sequence to be processed corresponding to the text to be processed, and an up-sampling network may be used to perform up-sampling processing on the word feature to be processed, so that the word feature to be processed is aligned with the phoneme sequence, and the aligned word feature to be processed is taken as the target word feature.

In the embodiment of the disclosure, after the word feature to be processed is aligned based on the phoneme sequence to be processed to obtain the target word feature, the prosodic feature to be processed of the text to be processed may be predicted based on the target word feature and the associated prosodic feature, and the associated prosodic feature may be input into a preprocessing neural network, the obtained output result of the preprocessing neural network may be spliced with the target word features, and the spliced feature may be input into a long short-term memory (LSTM) neural network for prediction processing, to obtain the prosodic feature to be processed of the text to be processed.

Optionally, in some embodiments, when the prosodic feature to be processed of the text to be processed is predicted based on the target word feature and the associated prosodic feature, the first spliced feature may be obtained by splicing the target word feature and the associated prosodic feature, and the prosodic feature to be processed of the text to be processed may be predicted based on the first spliced feature, so that the prediction of the prosodic feature to be processed of the text to be processed may be achieved based on the first spliced feature. Since the prosodic feature to be processed is predicted in combination with the associated prosodic feature, a fine prosodic feature of for example relatively detailed and richer words in the text to be processed may be acquired while a global prosodic feature of the text to be processed is acquired.

In the embodiment of the disclosure, when the prosodic feature to be processed of the text to be processed is predicted based on the target word feature and the associated prosodic feature, feature vector splicing processing may be performed on the target word feature and the associated prosodic feature, and the spliced feature may be taken as the first spliced feature, and the first spliced feature may be input into an LSTM neural network for processing, and the output result of the LSTM neural network may be input into a linear layer for prediction processing, to obtain the prosodic feature to be processed of the text to be processed.

Figure 7:
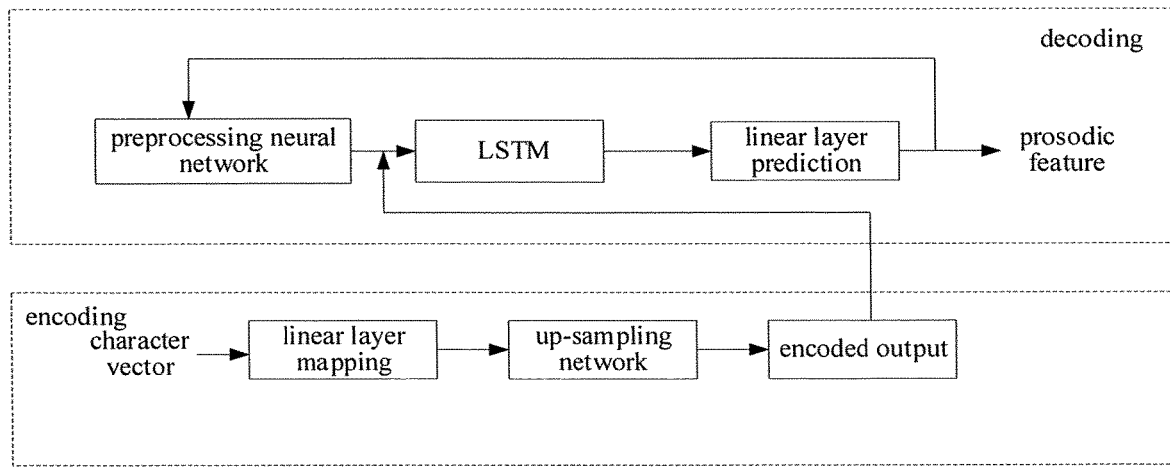
FIG. 7 is a flowchart illustrating prosodic feature prediction according to an embodiment of the disclosure.

For example, as illustrated in FIG. 7, FIG. 7 is a flowchart illustrating prosodic feature prediction according to an embodiment of the disclosure. When the prosodic feature to be processed of the text to be processed is predicted based on the word feature to be processed and the associated prosodic feature, the word feature to be processed may be input into a two-layer linear layer for mapping and dimension-reduction representation, and the output result of the linear layer may be input into an up-sampling network for alignment processing to obtain the target word feature, and the first spliced feature is obtained by splicing the target word feature and the associated prosodic feature of the associated text, and the first spliced feature is input into an LSTM neural network for processing, the output result of the LSTM neural network may be input into a linear layer for prediction processing, to obtain the prosodic feature to be processed of the text to be processed.

At S607, a fusion feature to be processed is obtained by fusing the associated text feature, the prosodic feature to be processed and the voice feature to be processed.

In the embodiment of the disclosure, after the associated text feature, the prosodic feature to be processed and the voice feature to be processed, feature vector splicing processing may be performed on the associated text feature, the prosodic feature to be processed and the voice feature to be processed, and the spliced feature vector may be input into an attention model for weight calculation and feature vector weight allocation, to obtain the processed feature as the fusion feature to be processed.

At S608, a spectrum feature to be processed is generated based on the fusion feature to be processed.

In the embodiment of the disclosure, after the fusion feature to be processed is obtained by fusing the associated text feature, the prosodic feature to be processed and the voice feature to be processed, the spectrum feature to be processed may be generated based on the fusion feature to be processed.

In the embodiment of the disclosure, when the spectrum feature to be processed is generated based on the fusion feature to be processed, the fusion feature to be processed may be input into an LSTM neural network for processing and into a linear layer for prediction processing, to obtain an initially-predicted sound spectrum feature, and the sound spectrum feature is input into a post-processing neural network for residual prediction processing, and the initially-predicted sound spectrum feature and the residual obtained by prediction processing of the post-processing neural network are added, to obtain a final predicted sound spectrum feature, and the final predicted sound spectrum feature is taken as the spectrum feature to be processed of the text to be processed.

In the embodiment, by predicting the voice feature to be processed of the text to be processed based on the word feature to be processed, predicting the prosodic feature to be processed of the text to be processed based on the word feature to be processed and the associated prosodic feature, and obtaining the fusion feature to be processed by fusing the associated text feature, the prosodic feature to be processed and the voice feature to be processed, and generating the spectrum feature to be processed based on the fusion feature to be processed, the prosodic feature of the text to be processed may be adjusted by fully combining the associated prosodic feature of the associated text, the associated text feature and the voice feature to be processed, which enriches the spectrum feature to be processed of the text to be processed, effectively improves the richness of prosodic change in the generated target voice and enhances a voice expression effect of the target voice.

Figure 8:
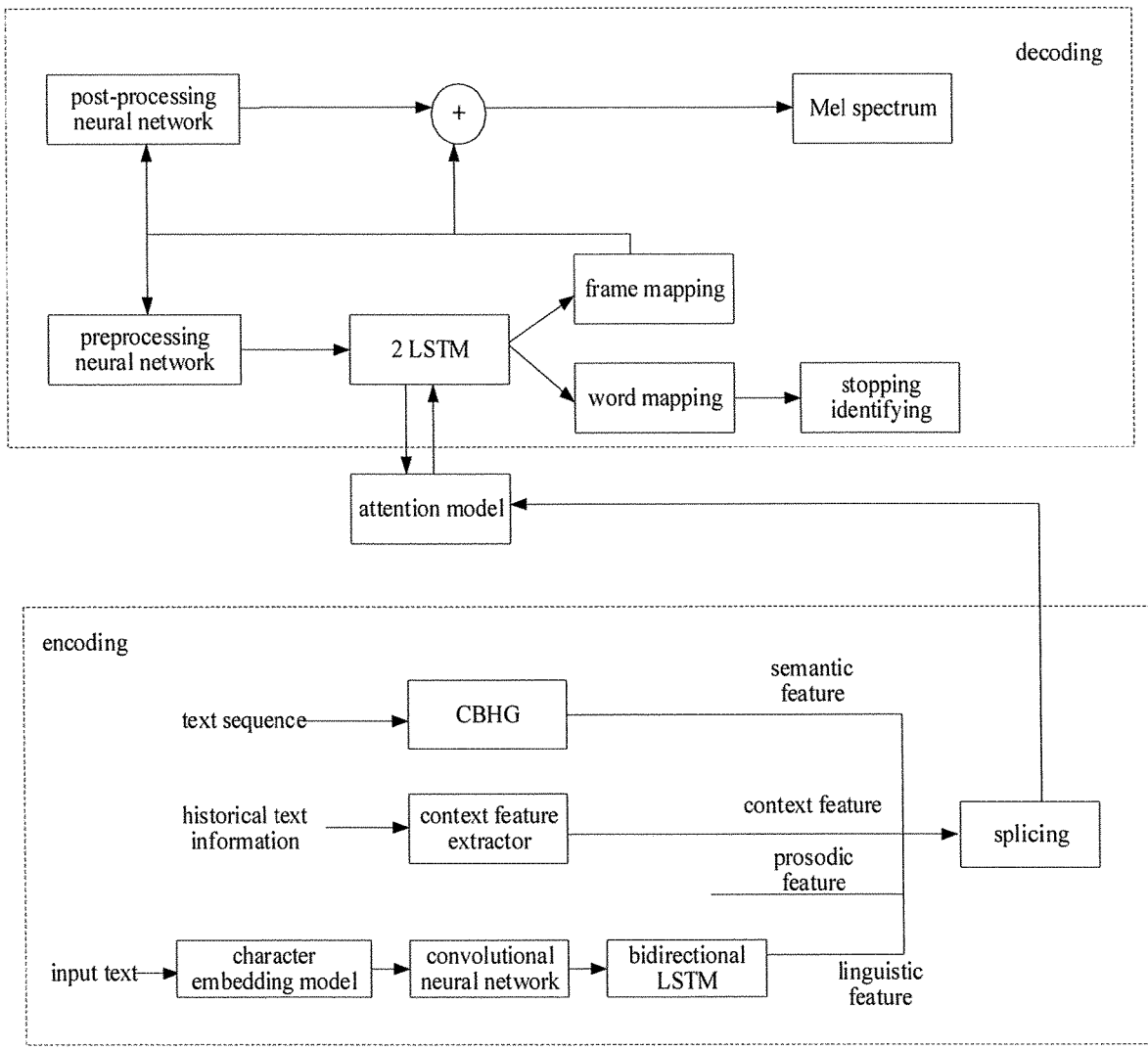
FIG. 8 is a flowchart illustrating spectrum feature generation according to an embodiment of the disclosure.

For example, as illustrated in FIG. 8, FIG. 8 is a flowchart illustrating spectrum feature generation according to an embodiment of the disclosure. After the associated text feature and the prosodic feature to be processed are determined, and the text linguistic feature and the text semantic feature of the text to be processed are determined as the voice feature to be processed, the fusion feature to be processed may be obtained by fusing the associated text feature, the prosodic feature to be processed, the text linguistic feature and the text semantic feature of the text to be processed, and the fusion feature to be processed may be input into an attention model for weight calculation, and residual calculation is performed using a post-processing neural network, and the calculated residual and the predicted sound spectrum feature are added to obtain a final predicted sound spectrum feature as the spectrum feature to be processed corresponding to the text to be processed.

At S609, a target voice corresponding to the text to be processed is generated based on the spectrum feature to be processed.

The explanation of S609 may refer to the above embodiment, which will not be repeated here.

In the embodiment, by predicting the voice feature to be processed of the text to be processed based on the word feature to be processed, predicting the prosodic feature to be processed of the text to be processed based on the word feature to be processed and the associated prosodic feature, obtaining the fusion feature to be processed by fusing the associated text feature, the prosodic feature to be processed and the voice feature to be processed, and generating the spectrum feature to be processed based on the fusion feature to be processed, the prosodic feature of the text to be processed may be adjusted by fully combining the associated prosodic feature of the associated text, the associated text feature and the voice feature to be processed, which enriches the spectrum feature to be processed of the text to be processed, effectively improves the richness of prosodic change in the generated target voice and enhances a voice expression effect of the target voice. By acquiring a text to be processed, determining an associated text of the text to be processed, acquiring the associated prosodic feature of the associated text, determining the associated text feature of the associated text based on the text to be processed, determining the spectrum feature to be processed of the text to be processed based on the associated prosodic feature and the associated text feature, and generating the target voice corresponding to the text to be processed based on the spectrum feature to be processed, the prosodic feature of the text to be processed may be adjusted by fully combining the associated prosodic feature of the associated text, which enriches the spectrum feature to be processed of the text to be processed, thereby effectively improving expression of the generated target voice and improving practicability and applicability of the target voice in an application scene.

Figure 9:
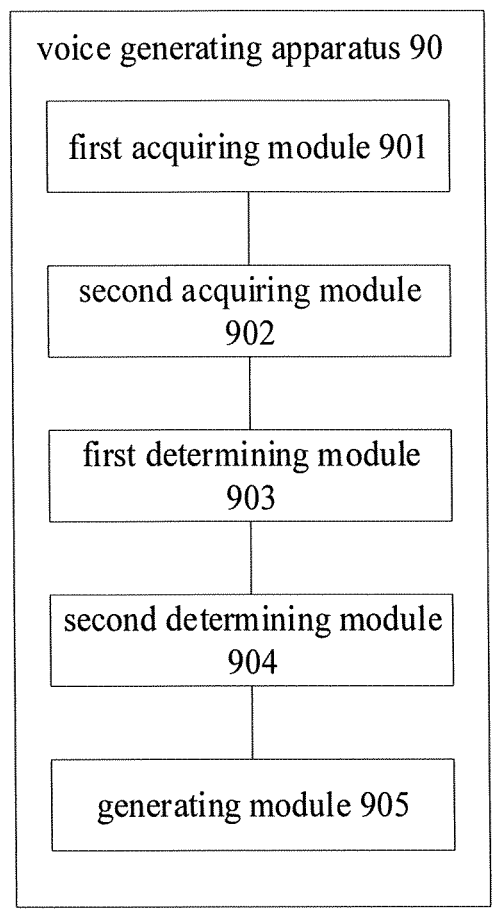
FIG. 9 is a diagram according to a fourth embodiment of the disclosure.

FIG. 9 is a diagram according to a fourth embodiment of the disclosure.

As illustrated in FIG. 9, a voice generating apparatus 90 includes a first acquiring module 901, a second acquiring module 902, a first determining module 903, a second determining module 904 and a generating module 905.

The first acquiring module 901 is configured to acquire a text to be processed, and determine an associated text of the text to be processed.

The second acquiring module 902 is configured to acquire an associated prosodic feature of the associated text.

The first determining module 903 is configured to determine an associated text feature of the associated text based on the text to be processed.

The second determining module 904 is configured to determine a spectrum feature to be processed of the text to be processed based on the associated prosodic features and the associated text features.

The generating module 905 is configured to generate a target voice corresponding to the text to be processed based on the spectrum feature to be processed.

Figure 10:
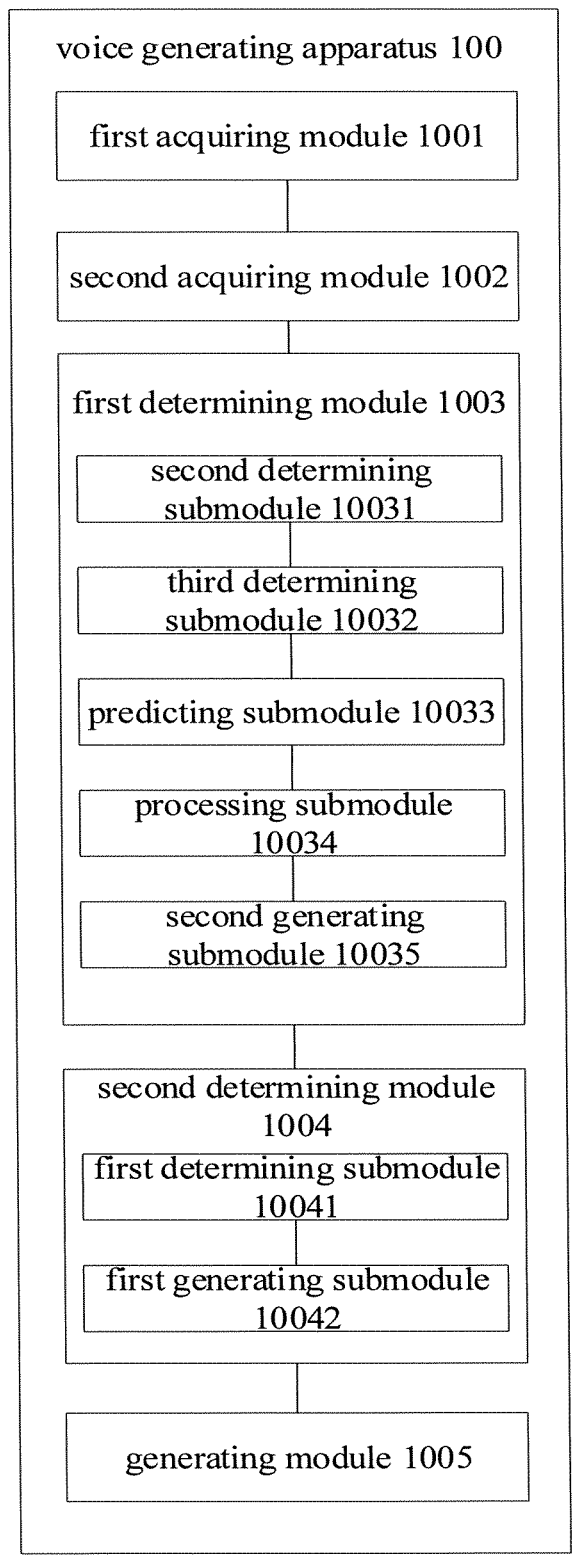
FIG. 10 is a diagram according to a fifth embodiment of the disclosure.

In some embodiments of the disclosure, as illustrated in FIG. 10, FIG. 10 is a diagram according to a fifth embodiment of the disclosure. The voice generating apparatus 100 includes a first acquiring module 1001, a second acquiring module 1002, a first determining module 1003, a second determining module 1004 and a generating module 1005. The second determining module 1004 includes a first determining submodule 10041 and a first generating submodule 10042.

The first determining submodule 10041 is configured to determine a word feature to be processed of the text to be processed.

The first generating submodule 10042 is configured to generate the spectrum feature to be processed of the text to be processed based on the associated prosodic feature, the associated text feature and the word feature to be processed.

In some embodiments of the disclosure, the first generating submodule 10042 is specifically configured to: predict a voice feature to be processed of the text to be processed based on the word feature to be processed; predict a prosodic feature to be processed of the text to be processed based on the word feature to be processed and the associated prosodic feature; obtain a fusion feature to be processed by fusing the associated text feature, the prosodic feature to be processed and the voice feature to be processed; and generate the spectrum feature to be processed based on the fusion feature to be processed.

In some embodiments of the disclosure, the first generating submodule 10042 is further configured to: determine a phoneme sequence to be processed corresponding to the text to be processed; obtain a target word feature by performing alignment processing on the word feature to be processed based on the phoneme sequence to be processed; and predict the prosodic feature to be processed of the text to be processed based on the target word feature and the associated prosodic feature.

In some embodiments of the disclosure, the first generating submodule 10042 is further configured to: obtain a first spliced feature by splicing the target word feature and the associated prosodic feature; and predict the prosodic feature to be processed of the text to be processed based on the first spliced feature.

In some embodiments of the disclosure, the first determining module 1003 includes a second determining submodule 10031, a second determining submodule 10032, a predicting submodule 10033, a processing submodule 10034 and a second generating submodule 10035.

The second determining submodule 10031 is configured to determine a sentence feature to be processed of the text to be processed.

The third determining submodule 10032 is configured to determine an associated sentence feature of the associated text.

The predicting submodule 10033 is configured to predict a context feature corresponding to the associated text based on the associated sentence feature.

The processing submodule 10034 is configured to obtain a second spliced feature by splicing the context feature and the sentence feature to be processed.

The second generating submodule 10035 is configured to generate the associated text feature of the associated text based on the second spliced feature.

In some embodiments of the disclosure, the second acquiring module 1002 is specifically configured to: determine an associated spectrum feature and an associated voice feature of the associated text; obtain a prosodic feature corresponding to the associated phoneme sequence of the associated text by processing the associated voice feature based on the associated spectrum feature; and take the prosodic feature as the associated prosodic feature.

In some embodiments of the disclosure, the first generating submodule 10042 is further configured to: predict a linguistic feature to be processed and a semantic feature to be processed of the text to be processed based on the word feature to be processed; and collectively take the linguistic feature to be processed and the semantic feature to be processed as the voice feature to be processed.

It needs to be noted that the foregoing explanation of the voice generating method is also applied to the voice generating apparatus in the embodiment, which will not be repeated here.

In the embodiment, by acquiring the text to be processed, determining the associated text of the text to be processed, acquiring the associated prosodic feature of the text to be processed, determining the associated text feature of the associated text based on the text to be processed, determining the spectrum feature to be processed of the text to be processed based on the associated prosodic feature and the associated text feature, and generating the target voice corresponding to the text to be processed based on the spectrum feature to be processed, the associated text of the text to be processed can be determined, and the prosodic feature of the text to be processed can be adjusted by fully combining the associated prosodic feature of the associated text, which effectively improves the accuracy of spectrum representation of the spectrum feature to be processed for the text to be processed, thereby effectively improving a representation effect of the synthesized target voice and improving practicability and applicability of the target voice in an application scene.

According to the embodiment of the disclosure, an electronic device, a readable storage medium and a computer program product are further provided.

Figure 11:
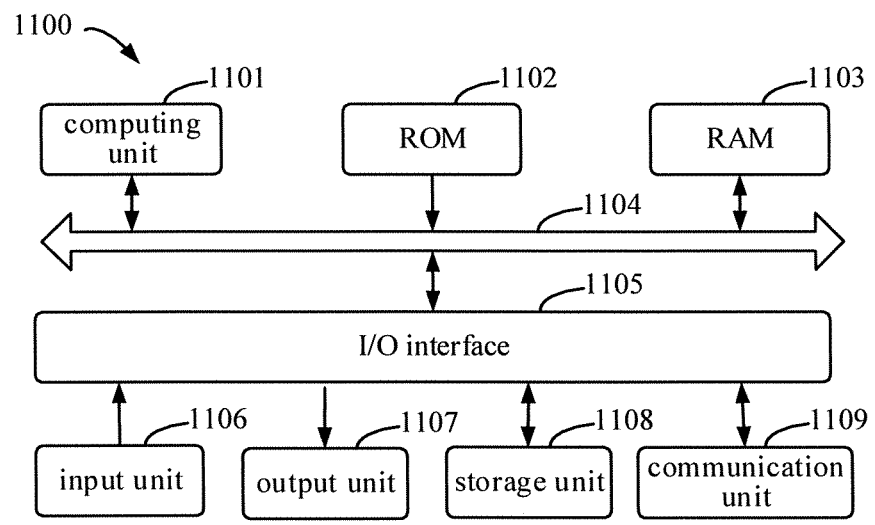
FIG. 11 illustrates a schematic block diagram of an example electronic device configured to implement a voice generating method according to an embodiment of the disclosure.

FIG. 11 illustrates a schematic block diagram of an example electronic device 1100 configured to implement the embodiment of the disclosure. An electronic device is intended to represent various types of digital computers, such as laptop computers, desktop computers, workstations, personal digital assistants, servers, blade servers, mainframe computers, and other suitable computers. An electronic device may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As illustrated in FIG. 11, the device 1100 includes a computing unit 1101, configured to execute various appropriate actions and processes according to a computer program stored in a read-only memory (ROM) 1102 or loaded from a storage unit 1108 to a random-access memory (RAM) 1103. In a RAM 1103, various programs and data required by an operation of a device 1100 may be further stored. The computing unit 1101, the ROM 1002, and the RAM 1103 are connected to each other through a bus 1104. An input/output (I/O) interface 1105 is also connected to a bus 1104.

Several components in the device 1100 are connected to the I/O interface 1105, and include: an input unit 1106, for example, a keyboard, a mouse, etc.; an output unit 1107, for example, various types of displays, speakers, etc.; a storage unit 1108, for example, a magnetic disk, an optical disk, etc.; and a communication unit 1109, for example, a network card, a modem, a wireless communication transceiver, etc. The communication unit 1109 allows the device 1100 to exchange information/data with other devices over a computer network such as the Internet and/or various telecommunication networks.

The computing unit 1101 may be various general and/or dedicated processing components with processing and computing ability. Some examples of the computing unit 1101 include but not limited to a central processing unit (CPU), a graphs processing unit (GPU), various dedicated artificial intelligence (AI) computing chips, various computing units running a machine learning model algorithm, a digital signal processor (DSP), and any appropriate processor, controller, microcontroller, etc. The computing unit 1101 performs various methods and processings, for example, a method for generating a voice. For example, in some embodiments, a method for speech generation may be further achieved as a computer software program, which is physically contained in a machine-readable medium, such as a storage unit 1108. In some embodiments, a part or all of the computer program may be loaded and/or installed on the device 1100 through a ROM 1102 and/or a communication unit 1109. When the computer program is loaded on a RAM 1103 and performed by a computing unit 1101, one or more blocks of the method for generating a voice may be performed. Alternatively, in other embodiments, a computing unit 1101 may be configured to perform the voice generating method in other appropriate ways (for example, by virtue of a firmware).

Various implementation modes of the systems and technologies described above may be achieved in a digital electronic circuit system, a field programmable gate array (FPGA), an application-specific integrated circuit (ASIC), an application specific standard product (ASSP), a system-on-chip (SOC) system, a complex programmable logic device, a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

A computer code configured to execute a method in the present disclosure may be written with one or any combination of a plurality of programming languages. The programming languages may be provided to a processor or a controller of a general-purpose computer, a dedicated computer, or other apparatuses for programmable data processing so that the function/operation specified in the flowchart and/or block diagram may be performed when the program code is executed by the processor or controller. A computer code may be performed completely or partly on the machine, performed partly on the machine as an independent software package and performed partly or completely on the remote machine or server.

In the context of the disclosure, a machine-readable medium may be a tangible medium that may contain or store a program intended for use in or in conjunction with an instruction execution system, apparatus, or device. A machine-readable medium may be a machine-readable signal medium or a machine-readable storage medium. A machine-readable storage medium may include but not limited to an electronic, magnetic, optical, electromagnetic, infrared, or semiconductor system, apparatus or device, or any appropriate combination thereof. A more specific example of a machine-readable storage medium includes an electronic connector with one or more cables, a portable computer disk, a hardware, a random-access memory (RAM), a read-only memory (ROM), an erasable programmable read-only memory (an EPROM or a flash memory), an optical fiber device, and a portable optical disk read-only memory (CDROM), an optical storage device, a magnetic storage device, or any appropriate combination of the above.

In order to provide interaction with the user, the systems and technologies described here may be implemented on a computer, and the computer has: a display apparatus for displaying information to the user (for example, a CRT (cathode ray tube) or an LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a speech input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), an internet and a blockchain network.

The computer system may include a client and a server. The client and server are generally far away from each other and generally interact with each other through a communication network. The relationship between the client and the server is generated by computer programs running on the corresponding computer and having a client-server relationship with each other. A server may be a cloud server, also known as a cloud computing server or a cloud host, is a host product in a cloud computing service system, to solve the shortcomings of large management difficulty and weak business expansibility existed in the conventional physical host and Virtual Private Server (VPS) service. A server further may be a server with a distributed system, or a server in combination with a blockchain.

It should be understood that, various forms of procedures shown above may be configured to reorder, add or delete blocks. For example, blocks described in the disclosure may be executed in parallel, sequentially, or in different orders, as long as the desired result of the technical solution disclosed in the present disclosure may be achieved, which will not be limited herein.

The above specific implementations do not constitute a limitation on the protection scope of the disclosure. Those skilled in the art should understand that various modifications, combinations, sub-combinations and substitutions may be made according to design requirements and other factors. Any modification, equivalent replacement, improvement, etc., made within the spirit and principle of embodiments of the present disclosure shall be included within the protection scope of the present disclosure.

What is claimed is:

1. A voice generating method, comprising:
    acquiring a text to be processed, and determining an associated text of the text to be processed, wherein the associated text is a context text of the text to be processed;
    acquiring an associated prosodic feature of the associated text;
    determining an associated text feature of the associated text based on the text to be processed, wherein the associated text feature comprises a semantic information feature of the associated text;
    determining a spectrum feature to be processed of the text to be processed based on the associated prosodic feature and the associated text feature; and
    generating a target voice corresponding to the text to be processed based on the spectrum feature to be processed.

2. The method of claim 1, wherein, determining the spectrum feature to be processed of the text to be processed based on the associated prosodic feature and the associated text feature, comprises:
    determining a word feature to be processed of the text to be processed; and generating the spectrum feature to be processed of the text to be processed based on the associated prosodic feature, the associated text feature and the word feature to be processed.

3. The method of claim 2, wherein, generating the spectrum feature to be processed of the text to be processed based on the associated prosodic feature, the associated text feature and the word feature to be processed, comprises:
predicting a voice feature to be processed of the text to be processed based on the word feature to be processed;
predicting a prosodic feature to be processed of the text to be processed based on the word feature to be processed and the associated prosodic feature;
obtaining a fusion feature to be processed by fusing the associated text feature, the prosodic feature to be processed and the voice feature to be processed; and
generating the spectrum feature to be processed based on the fusion feature to be processed.

4. The method of claim 3, wherein, predicting the prosodic feature to be processed of the text to be processed based on the word feature to be processed and the associated prosodic feature, comprises:
determining a phoneme sequence to be processed corresponding to the text to be processed;
obtaining a target word feature by performing alignment processing on the word feature to be processed based on the phoneme sequence to be processed; and
predicting the prosodic feature to be processed of the text to be processed based on the target word feature and the associated prosodic feature.

5. The method of claim 4, wherein, predicting the prosodic feature to be processed of the text to be processed based on the target word feature and the associated prosodic feature, comprises:
obtaining a first spliced feature by splicing the target word feature and the associated prosodic feature; and
predicting the prosodic feature to be processed of the text to be processed based on the first spliced feature.

6. The method of claim 3, wherein, predicting the voice feature to be processed of the text to be processed based on the word feature to be processed, comprises:
predicting a linguistic feature to be processed and a semantic feature to be processed of the text to be processed based on the word feature to be processed; and
collectively taking the linguistic feature to be processed and the semantic feature to be processed as the voice feature to be processed.

7. The method of claim 1, wherein, determining the associated text feature of the associated text based on the text to be processed, comprises:
determining a sentence feature to be processed of the text to be processed;
determining an associated sentence feature of the associated text;
predicting a context feature corresponding to the associated text based on the associated sentence feature;
obtaining a second spliced feature by splicing the context feature and the sentence feature to be processed; and
generating the associated text feature of the associated text based on the second spliced feature.

8. The method of claim 1, wherein, acquiring the associated prosodic feature of the associated text, comprises:
determining an associated spectrum feature and an associated voice feature of the associated text;
obtaining a prosodic feature corresponding to the associated phoneme sequence of the associated text by processing the associated voice feature based on the associated spectrum feature; and
taking the prosodic feature as the associated prosodic feature.

9. An electronic device, comprising:
at least one processor; and
a memory communicatively connected to the at least one processor; wherein,
the memory is stored with instructions executable by the at least one processor, when the instructions are performed by the at least one processor, the at least one processor is caused to perform the voice generating method, comprising:
acquiring a text to be processed, and determining an associated text of the text to be processed, wherein the associated text is a context text of the text to be processed;
acquiring an associated prosodic feature of the associated text;
determining an associated text feature of the associated text based on the text to be processed, wherein the associated text feature comprises a semantic information feature of the associated text;
determining a spectrum feature to be processed of the text to be processed based on the associated prosodic feature and the associated text feature; and
generating a target voice corresponding to the text to be processed based on the spectrum feature to be processed.

10. The device of claim 9, wherein, determining the spectrum feature to be processed of the text to be processed based on the associated prosodic feature and the associated text feature, comprises:
determining a word feature to be processed of the text to be processed; and
generating the spectrum feature to be processed of the text to be processed based on the associated prosodic feature, the associated text feature and the word feature to be processed.

11. The device of claim 10, wherein, generating the spectrum feature to be processed of the text to be processed based on the associated prosodic feature, the associated text feature and the word feature to be processed, comprises:
predicting a voice feature to be processed of the text to be processed based on the word feature to be processed;
predicting a prosodic feature to be processed of the text to be processed based on the word feature to be processed and the associated prosodic feature;
obtaining a fusion feature to be processed by fusing the associated text feature, the prosodic feature to be processed and the voice feature to be processed; and
generating the spectrum feature to be processed based on the fusion feature to be processed.

12. The device of claim 11, wherein, predicting the prosodic feature to be processed of the text to be processed based on the word feature to be processed and the associated prosodic feature, comprises:
determining a phoneme sequence to be processed corresponding to the text to be processed;
obtaining a target word feature by performing alignment processing on the word feature to be processed based on the phoneme sequence to be processed; and
predicting the prosodic feature to be processed of the text to be processed based on the target word feature and the associated prosodic feature.

13. The device of claim 12, wherein, predicting the prosodic feature to be processed of the text to be processed based on the target word feature and the associated prosodic feature, comprises:
  obtaining a first spliced feature by splicing the target word feature and the associated prosodic feature; and
  predicting the prosodic feature to be processed of the text to be processed based on the first spliced feature.

14. The device of claim 11, wherein, predicting the voice feature to be processed of the text to be processed based on the word feature to be processed, comprises:
  predicting a linguistic feature to be processed and a semantic feature to be processed of the text to be processed based on the word feature to be processed; and
  collectively taking the linguistic feature to be processed and the semantic feature to be processed as the voice feature to be processed.

15. The device of claim 9, wherein, determining the associated text feature of the associated text based on the text to be processed, comprises:
  determining a sentence feature to be processed of the text to be processed;
  determining an associated sentence feature of the associated text;
  predicting a context feature corresponding to the associated text based on the associated sentence feature;
  obtaining a second spliced feature by splicing the context feature and the sentence feature to be processed; and
  generating the associated text feature of the associated text based on the second spliced feature.

16. The device of claim 9, wherein, acquiring the associated prosodic feature of the associated text, comprises:
  determining an associated spectrum feature and an associated voice feature of the associated text;
  obtaining a prosodic feature corresponding to the associated phoneme sequence of the associated text by processing the associated voice feature based on the associated spectrum feature; and
  taking the prosodic feature as the associated prosodic feature.

17. A non-transitory computer readable storage medium stored with computer instructions, wherein, the computer instructions are configured to cause a computer to perform the method voice generating method, comprising:
  acquiring a text to be processed, and determining an associated text of the text to be processed, wherein the associated text is a context text of the text to be processed;
  acquiring an associated prosodic feature of the associated text;
  determining an associated text feature of the associated text based on the text to be processed, wherein the associated text feature comprises a semantic information feature of the associated text;
  determining a spectrum feature to be processed of the text to be processed based on the associated prosodic feature and the associated text feature; and
  generating a target voice corresponding to the text to be processed based on the spectrum feature to be processed.

18. The storage medium of claim 17, wherein, determining the spectrum feature to be processed of the text to be processed based on the associated prosodic feature and the associated text feature, comprises:
  determining a word feature to be processed of the text to be processed; and
  generating the spectrum feature to be processed of the text to be processed based on the associated prosodic feature, the associated text feature and the word feature to be processed.

19. The storage medium of claim 18, wherein, generating the spectrum feature to be processed of the text to be processed based on the associated prosodic feature, the associated text feature and the word feature to be processed, comprises:
  predicting a voice feature to be processed of the text to be processed based on the word feature to be processed;
  predicting a prosodic feature to be processed of the text to be processed based on the word feature to be processed and the associated prosodic feature;
  obtaining a fusion feature to be processed by fusing the associated text feature, the prosodic feature to be processed and the voice feature to be processed; and
  generating the spectrum feature to be processed based on the fusion feature to be processed.

20. The storage medium of claim 19, wherein, predicting the prosodic feature to be processed of the text to be processed based on the word feature to be processed and the associated prosodic feature, comprises:
  determining a phoneme sequence to be processed corresponding to the text to be processed;
  obtaining a target word feature by performing alignment processing on the word feature to be processed based on the phoneme sequence to be processed; and
  predicting the prosodic feature to be processed of the text to be processed based on the target word feature and the associated prosodic feature.

* * * * *